Feb. 13, 1968  F. A. BAUMGARTEL ETAL  3,368,753
MEASUREMENT AND CONTROL OF BURNER EXCESS AIR
Filed Aug. 16, 1965  4 Sheets-Sheet 1

INVENTORS
FRANK A. BAUMGARTEL
WILLIAM T. HAGE
BY
Harold C. Meier
ATTORNEY

INVENTORS
FRANK A. BAUMGARTEL
WILLIAM T. HAGE
BY
Harold E. Meier
ATTORNEY

3,368,753
MEASUREMENT AND CONTROL OF BURNER EXCESS AIR

Frank A. Baumgartel, Mentor, and William T. Hage, Alliance, Ohio; said Baumgartel assignor to Bailey Meter Company, a corporation of Delaware, and said Hage assignor to The Babcock & Wilcox Company, a corporation of New Jersey
Filed Aug. 16, 1965, Ser. No. 479,897
13 Claims. (Cl. 236—14)

ABSTRACT OF THE DISCLOSURE

An apparatus for controlling the excess air at a burner having a photo-detector circuit generating an output signal proportional to the intensity of two distinct wave lengths of the combustion spectrum. The wave lengths selected are directly related to the fuel-air ratio. A controller responsive to the output signal of the photo-detector circuit positions a damper thereby controlling the ratio between the fuel and air supplied to the burner.

---

This invention relates to measurement and control of excess-air at a burner. In particular this invention relates to a system for and the method of controlling the excess-air at a burner by comparing the intensity of electromagnetic waves at various wave lengths produced by the combustion of fuel.

The chief distinction between combustion and other chemical reactions is the emission of electromagnetic radiation. It is therefore natural to expect that investigations of the character and intensity of radiation emitted would form an important part of the understanding of the combustion processes. Electromagnetic radiation is absorbed or emitted by virtue of and unique to various interactions of matter and energy. Two classifications to consider about the radiation emitted or absorbed is its location in the electromagnetic spectrum and its continuous or discontinuous nature.

Radiant energy is mapped according to its energy distribution in the electromagnetic spectrum with the lower energy interactions appearing as radiation in the infrared end and the higher energy interactions appearing as radiation at the ultraviolet end. The nature of the radiation emitting or absorbing interactions differs from one region of the spectrum to the other. Radiation exhibited in the infrared region originates principally from molecular interactions and thermal excitation. Those in the visible and ultraviolet are due principally to atomic and atomic-molecular interactions. The latter interactions involve considerably greater energy changes than do the former, and are therefore observed principally in the reactions occurring at high temperature.

Continuous or black-body radiation originates from the thermal excitation of the affected molecules. In the industrial furnace, this is characteristic of the radiation exhibited by hot refractory, hot fuel particles, and other surfaces at elevated temperatures. Energy emitted as continuous radiation accounts for the major portion involved in industrial energy conversion processes, and is exhibited in the infrared and visible regions principally.

Discontinuous spectra provide considerably more information as to the nature of the reactions since their origins as line spectra are the result of changes in electronic-energy levels within the atom. These changes are unique characteristics of specific atoms, their molecular species, and the energy interactions. The amount of energy emitted or absorbed is dependent on the population of the reactants and their degree of excitation. In so-called band spectra, the electronic interactions evidenced by line spectra are further enhanced by the unique interactions of the molecular reactant groups. Consequently discontinuous spectra provides a powerful tool to develop a basic understanding of the combustion process.

Explorations by early workers in the study of laboratory flames have revealed the role of the various short-lived free radicals occurring in the combustion of hydrocarbon-air mixtures. Of the several free radicals, viz, $C_2$, CH, HCO, OH that are observable, the OH radical is found to play a key role in the complex combustion reaction. It is also known that the population of the OH radicals and their excitation is dependent on the temperature of the reaction. In the primary combustion zone the temperature is a function of the fuel-air ratio, flame propagation rates, combustion turbulence, and other factors. Therefore, it appears that a measure of the activity of the OH radical provides an index of the firing conditions. The desired information is revealed in the form of emitted band spectra most evident at 2811 and 3064 Angstroms (A.).

Our invention makes use of the characteristic spectrum of the flame by comparing the relative intensity of two wave length bands. Two photo-detectors are used, one responsive to one wave length band, centered for example around 2811 Angstroms (A.) and the second responsive to a second wave length band, centered for example, around 3064 Angstrom (A.). The two photo detectors are connected in adjacent legs of a Wheatstone bridge circuit and develop a bridge signal proportional to the relationship of the selected wave lengths. To eliminate all but the desired wave length a light filter is mounted between the flame spectrum and each radiation detector.

In many applications a furnace is provided with a plurality of burners to obtain the desired total heat release. Thus, the furnace of a modern steam generator may have upward of 12 or more burners, each designed to produce a greater B.t.u. output than required by the largest size steam generators of a few years ago. In the present state of the art, fuel-air ratio is controlled only on a total fuel to total air basis, thus while this ratio may be as desired, the ratio at any one burner may be far from correct. The fuel to air ratio at one burner, for example, being in excess of that desired while that at another being less than that desired. As the losses due to a deficiency of air are greater than those due to an excess of air it is common practice to operate multi-burner furnaces at a higher excess-air than otherwise required, or desirable, to allow for the unequal fuel-air ratio at any of the individual burners.

Recent investigation has shown that reduction of excess air to a desired low level, in the order of 4%, materially reduces slagging and erosion as well as reducing the formation of harmful compounds in the combustion process which are exhausted to the atmosphere and contribute to the air pollution problem.

It has thus become of increasing importance to maintain and control excess air at each individual burner in a multiple burner furnace. Our invention has, as a particular object, the provision of a means for measuring and controlling with precision the fuel-air ratio at a burner to the end that overall a furnace may be operated at a minimum of excess-air. As an order of magnitude let it be said that modern multiple burner furnaces are presently operated with an excess of air of about 15%, with our invention said furnaces may be operated with an excess-air of approximately 4 or 5% or even less.

It is another object of our invention to provide apparatus for controlling the excess-air at a burner by means responsive to the flame spectrum.

Another object of our invention is to provide an improved method of controlling the excess-air at a burner by comparing the intensity of the radiation at two wave lengths.

Still another object of our invention is to provide apparatus for controlling the excess-air at a burner by employing two photo detectors, each responsive to radiation of a characteristic wave length of the flame.

For a complete understanding of our invention reference may be made to the description and the drawings wherein.

Figure 1:
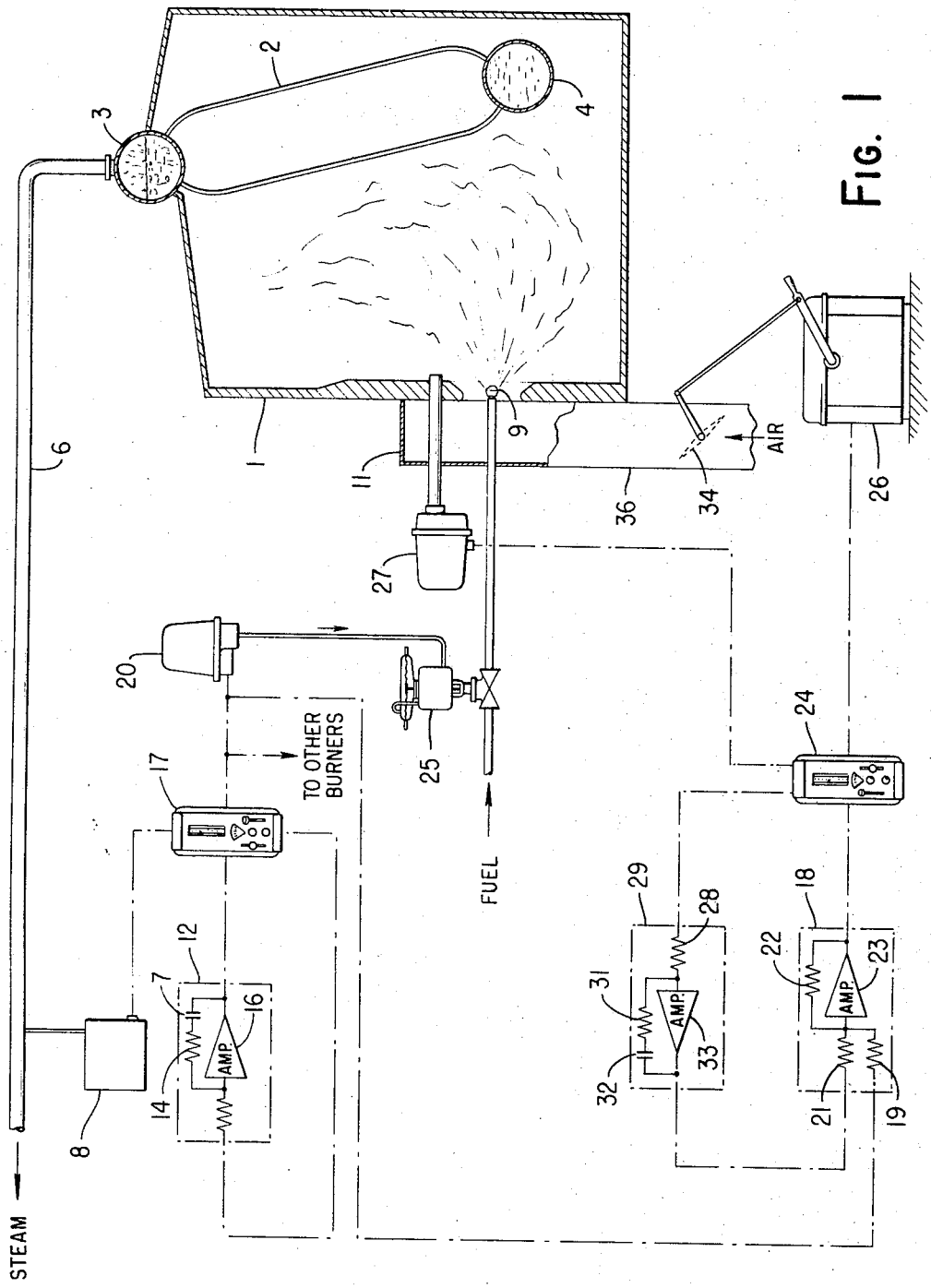
FIG. 1 is a schematic diagram of a fuel and air control system where the combustion air is corrected by a signal from a radiation detector.

Referring to FIG. 1, we diagrammatically illustrate a boiler 1, having vapor generating tubes 2, a steam-and-water drum 3 and a mud drum 4. Steam from the boiler 1 leaves the drum 3 through a pipe 6 and is measured by pressure transmitter 8. Steam pressure, as sensed by the transmitter 8 determines the fuel rate to a burner 9 and the flow of combustion air to a windbox 11 by means of a standard control system. As typical of such a system we show the pressure transmitter 8 operatively connected to a proportional plus reset controller 12 through a selector station 17. Included in the selector station 17 is an adjustable power supply which serves to establish the set point signal. The signal from the transmitter 8 is compared against the set point signal and the difference, or error signal, as it is commonly called, is transmitted to the proportional plus reset controller 12. The controller 12 operates to produce an output signal changing in proportion to changes in the error signal and continuously changing at a rate proportional to the magnitude of the error signal. As well known in the art, such action may be obtained through the inclusion of a feedback resistor 14 and a capacitor 7 acting in conjunction with an operational amplifier 16.

Selector station 17 also passes the output signal from the controller 12 to an electric to pneumatic $(e/p)$ converter 20. Functionally, the selector station 17 provides a means for transferring the control signal from the controller 12 to the $(e/p)$ converter 20 when in the automatic mode of operation and provides a means for supplying a manually adjustable control signal to the $(e/p)$ converter 20 when in the hand mode of operation. To provide the manual control signal, the selector station 17 has included therein an adjustable power supply having a range compatible with the output of the controller 12. The $(e/p)$ converter 20, as the name implies, converts the electric control signal from the controller 12 or from the manually adjustable supply of the selector station 17, as the case may be, to a proportional pneumatic signal. A thorough and complete description of the operation of an electric to pneumatic converter is given in the U.S. patent of M. O. Dustin et al., 3,080,878. Typically the pneumatic output signal from the $(e/p)$ converter 20 may vary from 3 p.s.i. for a −10 volt electric signal to 27 p.s.i. for a +10 volt signal. Connected to the output of the $(e/p)$ converter 20 is a pneumatically operated fuel control valve 25 that operates to increase the flow of fuel to the burner 9 upon an increasing demand signal from the $(e/p)$ converter 20 and decreasing the fuel flow upon a decreasing demand signal.

With a change in fuel flow to the burner 9 there is a corresponding change in combustion air through the windbox 11. The combustion air, like fuel flow, is controlled by the signal from the pressure transmitter 8 in accordance with changes in steam pressure. As shown a signal summing controller 18 connects to the output of the controller 12. The summing controller 18 includes two input resistors 19 and 21, a feedback resistor 22 and an amplifier 23 which may be identical to amplifier 16.

Connected to the controller 18 is a set point selector station 24 which includes a means for transferring the output of the controller to an electrically operated control drive 26. Similar to the previously described selector station 17, the set point selector station 24 includes a manually adjustable power supply and a means for switching the control of the drive 26 from the controller 18 to an adjustable power supply. In addition the selector station 24 also includes a set point power supply, the use of which will be described shortly. The control drive 26 positions a damper 34 in the duct 36 in accordance with the signal transmitted from the selector station 24.

Combustion may be defined as the rapid chemical combination of oxygen with the combustible elements of a fuel. The common fuels, coal, oil, gas, wood and their various derivatives have only three elemental constituents, carbon, hydrogen and sulphur, which unite with oxygen of the air to produce heat. To insure sufficient oxygen for complete combustion of fuel it is necessary to use more than the theoretical air requirements. The excess-air must, however, be held to a practical minimum to reduce the stack heat losses. In the combustion of fuel for the commercial generation of heat, there are certain inherent heat losses over which no control is possible, as well as other losses which are subject to some control. Excess-air is an avoidable heat loss, that is, one over which there is some control.

The excess-air at the burner 9 is measured by a photo-detector 27, to be described shortly, which develops an electrical signal proportional to the level of excess-air. This signal is connected to the set point selector station 24 and compared with the voltage of the set point power supply. A deviation of the measured signal from the set point voltage, either positive or negative, produces an error signal which is the input to a proportional plus integral controller 29. The proportional plus integral controller 29 includes an input resistor 28, a feedback resistor 31, a feedback capacitor 32 and an amplifier 33 that is similar to amplifier 16. The output of the proportional plus integral controller 29 varies in proportion to and as the time integral of the error (or input) signal and is connected to the resistor 21 of the summing controller 18.

A control loop of the type shown in FIG. 1 is commonly known as a two element system. As such, it has a primary signal, in this case a signal developed from steam pressure, and a secondary or corrective signal, here the signal developed from excess-air. An increase in steam pressure in pipe 6 simultaneously and proportionally decreases the fuel and combustion air supplied to the combustion zone of the boiler 1. Should the decrease in combustion air result in a level of excess-air, as measured by the photo-detector 27, less than that established in the setpoint selector station 24 an error signal will result at the input to the proportional plus integral controller 29. This error signal will be used by the summing controller 18 to readjust the combustion air flow until the proper excess-air is received. Thus, the damper is positioned from the primary signal, steam pressure, and readjusted from the secondary signal, excess-air.

Figure 2:
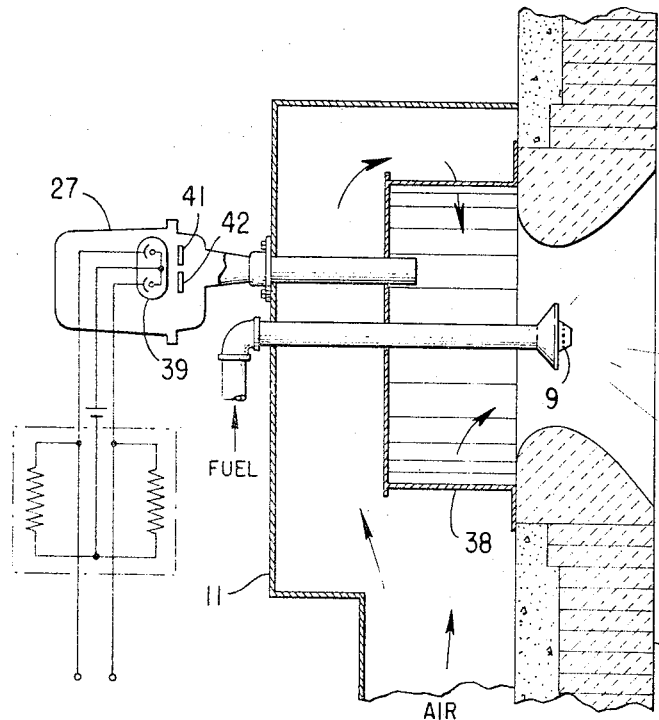
FIG. 2 is a schematic diagram of a burner and the arrangement of the photo detectors and their respective filters.

Referring to FIG. 2, we show the burner section of the boiler 1 of FIG. 1. In particular we show the burner 9 and the windbox 11 mounted on a furnace wall 37; within the windbox 11 are conventional registers 38. Also we show the photo-detector 27 mounted through an opening in the windbox 11 to view the flame at the burner 9.

The photo-detector 27 includes a photo-tube 39 having two separate light response elements in the same envelope. We could have, however, shown two individual light response elements each in its own envelope. Mounted between the light response elements of the photo-tube 39 and the flame are two interference filters 41 and 42 each transparent to only a certain narrow band of wave lengths. All wave lengths of the flame spectrum at the burner 9, not transmitted by the interference filters 41 and 42, are reduced in intensity to an extent that they have no affect on the sensitive areas of the photo-tube 39. A typical photo-detector for use with our invention would have one filter transparent to one narrow band, say around 2811 Angstroms (A.), and the second interference filter transparent to a second narrow band, for example, around 3,064 Angstroms (A.).

The particular circuit used with the photo-tube 39 is not significant; the one most commonly used is the Wheatstone bridge with one sensitive element in one leg and the other element in the adjacent leg as shown in FIG. 2. The Wheatstone bridge circuit is particularly well suited for our invention since we rely on the relative intensity of two wave length bands to determine the amount of excess-air in the combustion zone.

Figure 3:
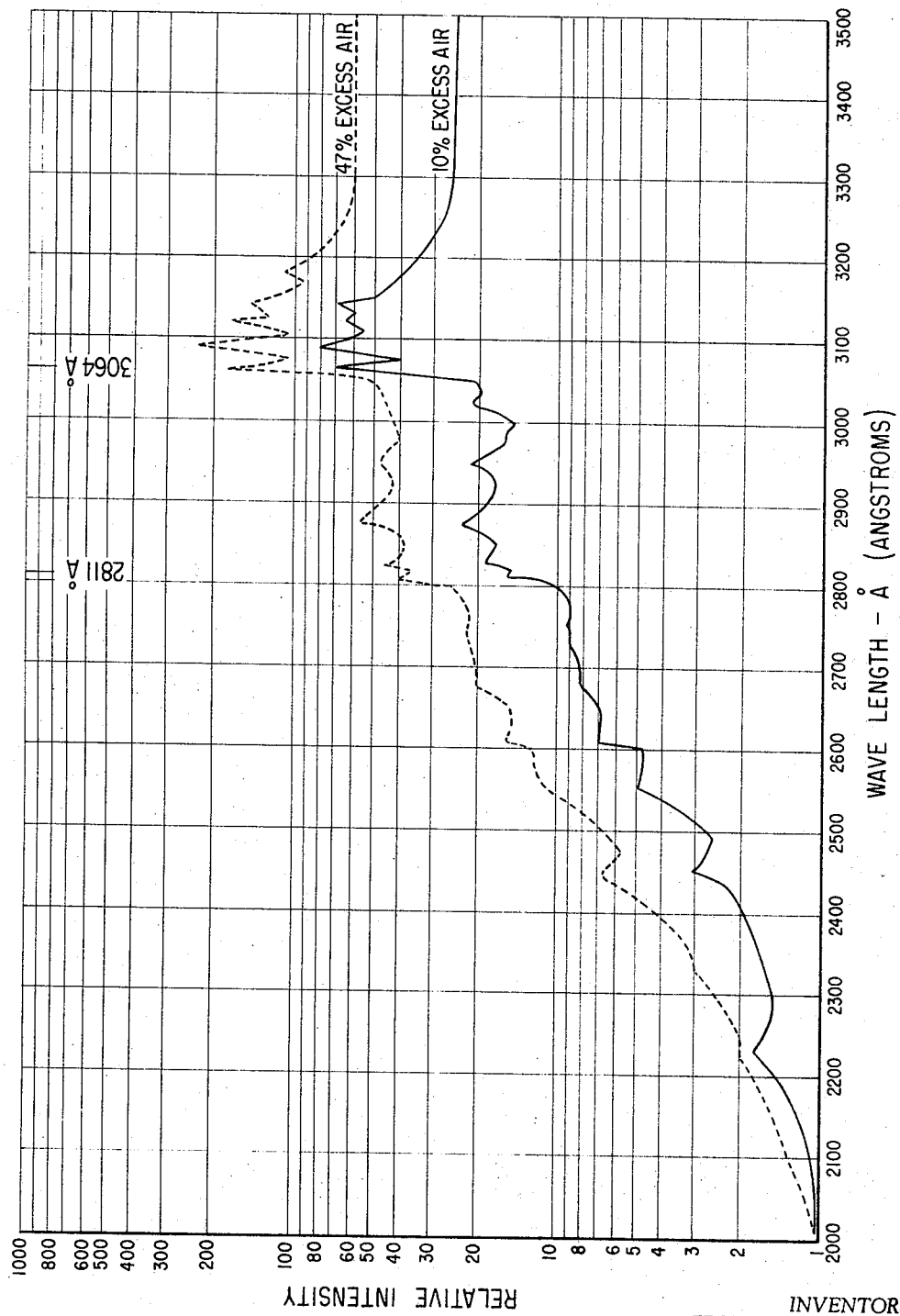
FIG. 3 is a diagram of a natural gas flame spectrum showing the OH radical peaks at 2811 and 3064 Angstroms (A.) at both 10% and 47% excess-air.

Assume, for purposes of illustration, the burner 9 is supplied with natural gas the combustion of which generates the spectrum as shown in FIG. 3. There are two wave length bands evident in FIG. 3, one occurring at about 2811 Angstroms (A.), the second occurring at 3064 Angstroms (A.). It has been determined by experimentation that these bands are related to the OH radical and their height directly related to the condition of the flame, in particular to the fuel-air ratio. As FIG. 3 shows, the relative intensity of the 2811 Angstrom (A.) wave length band is about 20 for 10% excess-air and about 50 for 47% excess-air. With filter 41 designed to pass 2811 Angstroms (A.) and filter 42 designed to pass 3064 Angstroms (A.), the output of the Wheatstone bridge circuit will be proportional to the intensities of the unfiltered wave lengths. As the excess-air varies the bridge output varies proportionally.

Figure 4:
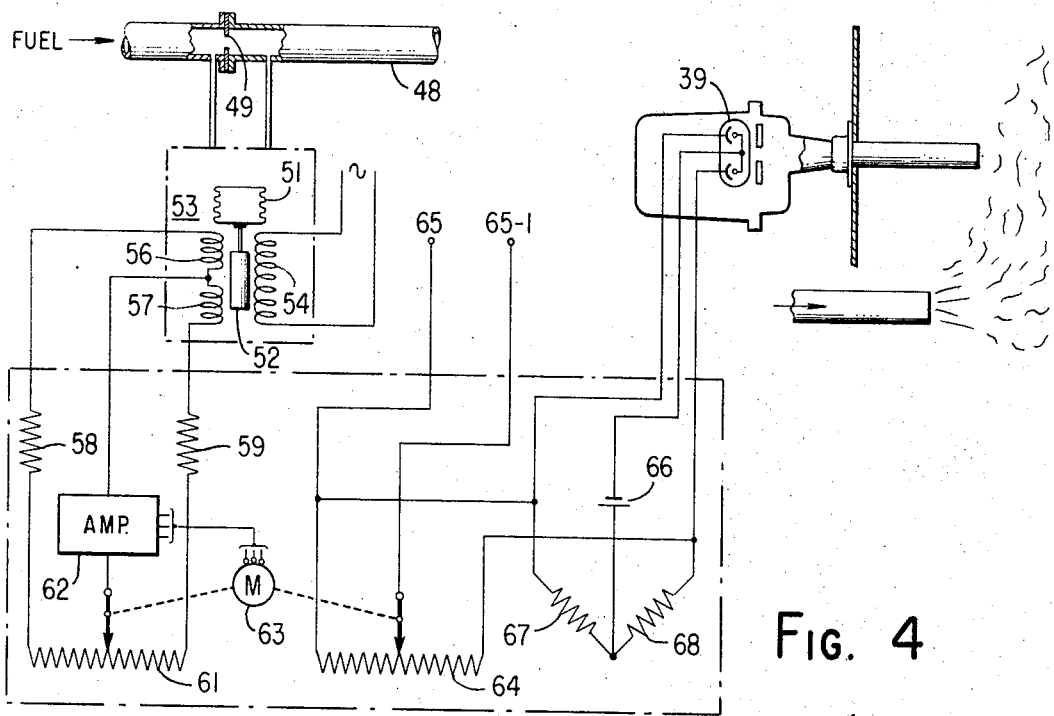
FIG. 4 is a schematic diagram of a firing rate compensation circuit operating in conjunction with the photo detector.

Although the Wheatstone bridge circuit is ideally well suited for our invention, additional circuitry may be required. Referring to FIG. 4, we show a Wheatstone bridge detector circuit operating in conjunction with a firing rate compensation circuit. The curves of FIG. 3 show that the relative intensity of the two selected wave length bands changes when there is a change in the level of excess-air. What FIG. 3 does not show is that for any given level of excess-air the intensity level of the entire spectrum varies directly with firing rate. Thus, means must be supplied which compensate for the spectrum intensity change due to varying firing rates.

The fuel flow compensation circuit of FIG. 4, in conjunction with the detector Wheatstone bridge circuit provides the necessary compensation. Flow of fuel in a pipe 48, which is directly proportional to firing rate, develops a differential pressure across an orifice restriction 49. Through various standard connections and linkage arrangements a bellows 51, shown schematically, responds to the differential pressure across the orifice restriction 49 and positions a movable core 52. The movable core 52 is part of a movable core transformer 53 having a primary winding 54 and a pair of serially connected secondary windings 56 and 57. The series connected secondary windings 56 and 57 are adjacent legs of a Wheatstone bridge circuit which includes resistors 58 and 59 and a potentiometer 61.

An A-C ratio bridge is formed by the two secondary windings 56 and 57 of the movable core transformer 53 and the resistances 58 and 59 on each side of the potentiometer 61. The bridge is balanced when the voltage ratio of one secondary winding to the other is equal to the ratio of the voltage drops across the resistances plus the voltage drops on each side of the wiper arm of the potentiometer. When this condition exists the voltage input to a servo-amplifier 62 is zero. A change in the rate of fuel flow through the line 48 moves the core 52 and unbalances the A-C ratio bridge. The amplifier 62 senses the bridge unbalance and applies a corrective voltage to a servo-motor 63 which through mechanical linkage positions the wiper arm of the potentiometer 61 until the circuit is restored to a balanced condition.

Also positioned by the servo-motor 63 is the wiper arm of a compensating potentiometer 64 which is connected to the output of the detector Wheatstone bridge circuit. The detector Wheatstone bridge includes the detector tube 39, as two adjacent arms, a battery supply 66, shown schematically, and two bridge resistors 67 and 68. At any fixed firing rate, and a given level of excess-air, the voltage developed across the compensating potentiometer 64 remains constant. However, should the firing rate vary, either increasing or decreasing, the detector bridge output, and consequently the voltage drop across the compensating potentiometer, will either increase or decrease because of the change in level of the entire spectrum. To compensate for this erroneous indication of excess-air the servo-motor 63, operating in response to the output of the servo-amplifier 62, positions the wiper arm of the compensating potentiometer 64 to eliminate the firing rate error from the control signal developed at the terminals 65 and 65–1. Thus, at any given level of excess-air the signal to the control system of FIG. 1 is rendered independent of firing rate.

Figure 5:
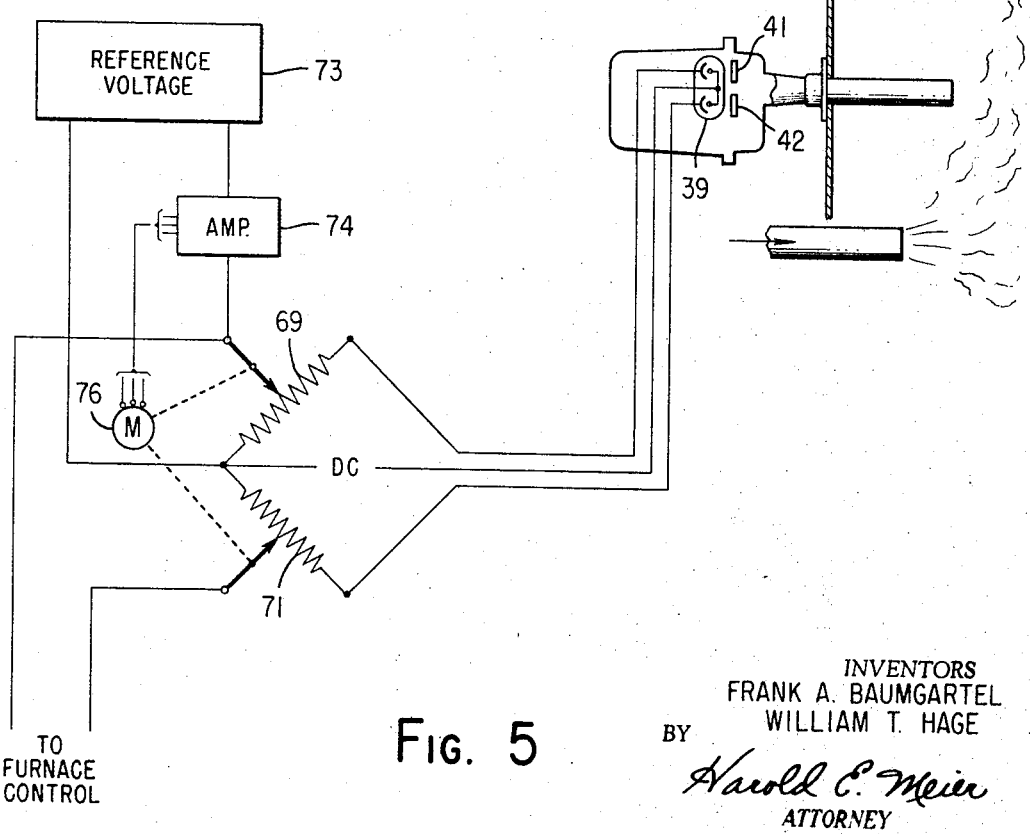
FIG. 5 is a schematic diagram of a normalizing photo detector circuit.

Another very desirable feature which we included in our excess-air control system is that of normalizing the detector bridge output. By normalizing we mean, the maintaining of one output terminal of the detector bridge at some given reference voltage. The result from normalizing the detector bridge is the generation of a maximum bridge output regardless of the excess-air level existing at the burner. Referring to FIG. 5, we show interference filters 41 and 42 interposed between the flame and the photo-detector 39. As explained earlier, the sensitive areas of the photo-detector 39 are adjacent legs of a Wheatstone bridge circuit which in the present embodiment includes two mechanically interconnected potentiometers 69 and 71. The output of the bridge circuit is the potential difference between the wiper arms of the potentiometers 69 and 71. Connected to one terminal of the potentiometer 69 is a reference voltage source 73 having an output signal for normalizing the bridge output. Also connected to the reference voltage source 73 is a servo-amplifier 74. The servo-amplifier 74 in turn is connected to the wiper arm of the potentiometer 69.

A change in radiation level passed through the interference filter 41 and incident upon the upper-half of the detector tube 39 causes a change in the voltage drop between the wiper arm and the end terminal of the potentiometer 69. The servo-amplifier 74 now responds to the difference between the reference voltage from the source 73 and from the wiper arm of the potentiometer 69 and energizes a servo-motor 76. Mechanically connected to the servo-motor 76 are the wiper arms of the potentiometers 69 and 71. Energizing the servo-motor 76 repositions the wiper arm of the potentiometers 69 and 71 until the input to the servo-amplifier 74 is zero. As a result of this repositioning action the potential at the wiper arm of the potentiometer 69 is maintained at a fixed value with respect to ground. Thus, the detector bridge is "normalized" and its output equal to plus or minus some fixed reference voltage.

Figure 6:
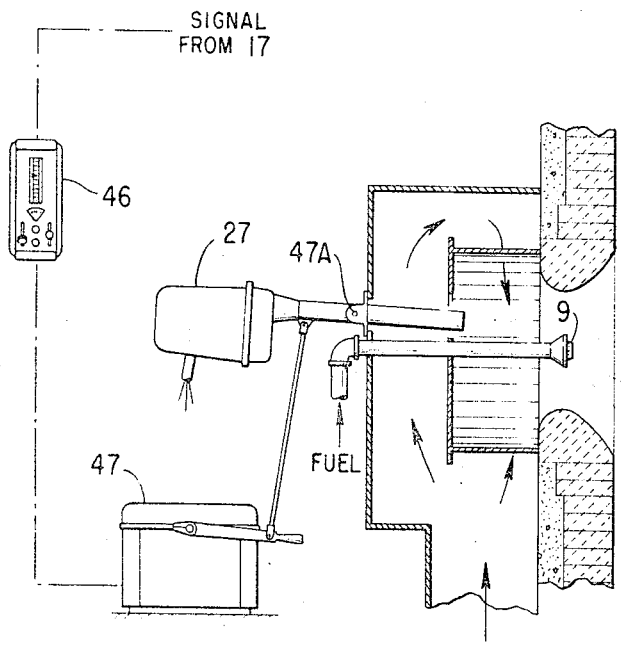
FIG. 6 is a schematic diagram of a control system for positioning the radiation detector in accordance with the firing rate of the burner.

In some applications it has been found that the maximum radiation area of a flame varies as the firing rate. At low firing rates the maximum radiation area would be adjacent to the burner and as the firing rate increases this area tends to move away from the burner throat. Referring to FIG. 6, we show a pivotally mounted detector 27 positioned in accordance with the firing rate by means of a simple control system. As shown, the signal transmitted from the selector station 17, which is proportional to the firing rate, is transmitted through a selector station 46 to a control drive 47 which angularly positions the photo-detector 27 about a pivot point 47A. The selector station 46 transfers the output signal from the selector station 17 to the electrically operated control drive 47 when the system is on automatic operation. The selector station 46 is similar to the selector station 17, and as such, contains a manually adjustable power supply for generating a control signal for the control drive 47 when the system is in the manual mode of operation.

As steam pressure decreases the flow of fuel to the burner 9 increases thereby causing the flame and its maximum radiation area to move away from the burner tip. Simultaneously with the increase in fuel flow, the control drive 47 rotates the detector 27 counterclockwise. A counterclockwise rotation of the detector 27 moves the area it sights farther into the furnace and away from the burner tip. Thus, the detector 27 will be responsive to the maximum radiation zone of the flame regardless of the firing rate.

Although we have discussed comparing the relative intensity of wave lengths at 2811 Angstroms (A.) and 3064 Angstroms (A.) our invention is not necessarily limited to these values. Other bands, either higher or lower in the spectrum, could be used. It should be obvious to the skilled artisan that many changes can be made in the equipment and its inter-connection without departing from the spirit of our invention. One obvious such substitution would be the use of pneumatic control components instead of the electronic that we have described. For the true scope of our invention reference is made to the appended claims.

What we claim as new and desire to secure by Letters Patent of the United States is:

1. Apparatus for controlling the fuel and air to the combustion zone of a steam boiler, comprising:
   means for measuring the steam pressure of said boiler and generating a signal proportional thereto;
   a first controller responsive to the signal generated by said measuring means, the output of said controller varying proportionally and as the time integral of the output of said measuring means;
   a burner for discharging fuel and air to the combustion zone of said boiler, the combustion of said fuel and air emitting a characteristic spectrum of wave lengths of varying intensities;
   control means responsive to the output of said first controller for controlling the fuel supplied to said burner;
   means for comparing the intensity of two wave length bands of the spectrum produced by the combustion of fuel and air supplied by said burner and for generating a signal proportional to the comparison;
   a proportional plus integral controller connected to said comparing means for generating a corrective signal varying as the time integral of the difference between the proportional signal of said comparing means and an established set point;
   a second controller responsive to the signal generated by said first controller and said proportional plus integral controller, the output of said second controller varying proportionally with the sum of its input signals;
   a damper controlling the amount of combustion air supplied said burner; and
   control means responsive to the output of said second controller for controlling the position of said damper.

2. Apparatus for controlling the fuel and air to the combustion zone of a boiler, comprising:
   means for measuring the pressure of the steam from said boiler and generating a signal proportional thereto;
   a first controller responsive to the signal generated by said measuring means, the output of said controller varying proportionally and as the time integral of the output of said measuring means;
   a burner for discharging fuel and air to the combustion zone of said boiler, combustion of said fuel and air emitting a characteristic spectrum of wave lengths of varying intensities;
   control means responsive to the output of said first controller for controlling the fuel supply to said burner;
   a photo-detector responsive to the intensity of two wave lengths of the spectrum produced by the combustion of fuel and air in said combustion zone, said photo-detector movably mounted and generating a signal proportional to the intensity of said wave lengths;
   control means responsive to the output of said first controller and connected to said movably mounted detector for positioning said detector in accordance with the output of said first controller;
   a proportional plus integral controller connected to said photo-detector for generating a corrective signal that varies as the time integral of the difference between the proportional signal of said detector and an established set point;
   a second controller responsive to the signal generated by said first controller and said proportional plus integral controller, the output of said second controller varying proportionally with the sum of its input signals;
   a windbox for supplying air to said burner;
   a damper controlling the amount of combustion air entering said windbox; and
   control means responsive to the output of said second controller for controlling the position of said damper.

3. Apparatus for controlling the fuel and air to the combustion zone of a boiler, comprising:
   means for measuring the output of said boiler and generating a signal proportional thereto;
   a burner for discharging fuel and air to the combustion zone of said boiler, combustion of said fuel and air emitting a characteristic spectrum of wave lengths of varying intensities;
   means responsive to the signal generated by said measuring means for controlling the fuel and air to said burner;
   means for detecting the presence of and comparing the relative intensity of two wave length bands of the spectrum produced by the combustion of fuel and air supplied by said burner, said means generating a signal proportional to the intensity of the wave lengths detected and compared; and
   means responsive to the signal generated by said detecting means modifying the control of air to said burner by said first signal.

4. Apparatus for controlling the fuel and air to the combustion zone of a boiler as set forth in claim 3 wherein said detecting and comparing means includes a pair of photo-cells each responsive to a separate narrow band of wave lengths of the spectrum produced by the combustion of fuel and air from said burner.

5. Apparatus for controlling the fuel and air to the combustion of a boiler as set forth in claim 4 wherein said photo-cells are in adjacent legs of a Wheatstone bridge circuit, the output of said bridge depending on the difference in intensity of the two detected wave lengths.

6. Apparatus for controlling the fuel and air to the combustion zone of a boiler as set forth in claim 4 wherein one of said photo-cells is responsive to 2811 Angstroms (A.) and the other of said photo-cells responds to 3064 Angstroms (A.).

7. Apparatus for controlling the fuel and air to the combustion zone of a boiler, comprising:
   means for measuring the output of said boiler and generating a signal proportional thereto;
   a burner for discharging fuel and air to the combustion zone of said boiler, combustion of said fuel and air emitting a spectrum of wave lengths of varying intensities;

means responsive to the signal generated by said means for controlling the fuel and air to said burner;

means for detecting the presence of and comparing the relative intensity of two wave length bands of the spectrum produced by the combustion of fuel and air supplied by said burner, said means generating a signal proportional to the intensity of the wave lengths detected and compared; and means responsive to the signal generated by said detecting means for modifying the flow of fuel to said burner by said first signal.

8. Apparatus for controlling excess-air, comprising:

a burner supplied with fuel and air, combustion of fuel at said burner emitting a spectrum of wave lengths of varying intensities;

means for comparing the relative intensity of two wave length bands of said spectrum and generating a signal proportional thereto;

means for measuring the flow of fuel to said burner;

means connected to said measuring means for modifying said generated signal in accordance with the rate of fuel flow to said burner; and control means connected to said modifying means for controlling the fuel-air ratio to maintain a given excess-air at said burner.

9. Apparatus for controlling excess-air, comprising:

a burner supplied with fuel and air, combustion of fuel at said burner emitting a spectrum of wave lengths of varying intensities;

a first detector responsive to the intensity of one wave length band of said spectrum;

a second detector responsive to the intensity of a second wave length band of said spectrum;

an electrical circuit connected to both of said detectors for generating a signal proportional to the relative intensity of the detected wave lengths;

flow measuring means including an electrical means for generating a signal proportional to fuel flow to said burner;

a second electrical circuit connected to the output of said flow measuring means and to said first electrical circuit for compensating the signal generated by said first electrical circuit in accordance with the rate of fuel flow to said burner; and means connected to said compensated signal for controlling the fuel-air ratio to maintain a given excess-air at said burner.

10. Apparatus for controlling excess-air, comprising:

a burner supplied with fuel and air, combustion of fuel at said burner emitting a spectrum of wave lengths for varying intensities;

a first detector responsive to the intensity of one wave length band of said spectrum;

a second detector responsive to the intensity of a second wave length band of said spectrum;

a first electrical circuit connected to said first and second detectors and forming a Wheatstone bridge with said detectors as adjacent arms;

a potentiometer connected across the output of said Wheatstone bridge;

flow measuring means having a movable core transformer for producing an electrical signal proportional to the flow of fuel to said burner;

a second electrical circuit connected to said flow measuring means and forming an A-C ratio bridge with said movable core transformer;

means responsive to the A-C ratio bridge for positioning the wiper arm of said potentiometer in accordance with the rate of fuel flow to said burner; and means connected to the wiper arm and one terminal of said potentiometer for controlling the fuel-air ratio to maintain a given excess-air at said burner.

11. Apparatus for controlling excess-air, comprising:

a burner supplied with fuel and air, combustion fuel at said burner emitting a spectrum of wave lengths of varying intensity;

means for comparing the relative intensity of two wave length bands of said spectrum and generating a signal proportional thereto;

a pair of potentiometers having their wiper arms mechanically interconnected, one end of said potentiometers connected to a common terminal and the second end of said potentiometers connected to said comparing means;

a reference voltage source connected to the common terminal of said potentiometers;

a servo amplifier connected to said voltage source and the wiper arm of one of said potentiometers, said servo amplifier responsive to the voltage difference between said source and said wiper arm and generating an output signal proportional to the voltage difference;

a servo motor connected to said servo amplifier and to the wiper arm of said potentiometers to position said arms to equalize the voltages connected to said servo amplifier; and means connected to the wiper arms of said potentiometers for controlling the fuel-air ratio to maintain a given excess-air at said burner.

12. Apparatus responsive to the intensity of radiation emitted by a flame comprising:

a movably mounted radiation detector;

control means operably connected to said detector for positioning said detector; and a control signal source, responsive to a parameter varying in relation to the position of the maximum radiation area of said flame connected to said control means and generating a control signal to position said radiation detector for sighting the maximum radiation area of said flame.

13. Apparatus for sighting a source of radiation as set forth in claim 12 wherein said detector includes two photo-cells, each responsive to separate wave lengths emitted by said flame.

References Cited

UNITED STATES PATENTS

| | | | |
|---|---|---|---|
| 2,306,073 | 12/1942 | Metcalf | 158—28 |
| 2,382,220 | 8/1945 | Fogle. | |
| 2,407,838 | 9/1946 | Kliener | 236—14 X |
| 3,011,058 | 11/1961 | Becker | 73—355 X |
| 3,101,618 | 8/1963 | Hance | 73—355 X |
| 3,193,199 | 7/1965 | Fuhs | 236—15 |

EDWARD J. MICHAEL, *Primary Examiner.*